United States Patent
Johnson (10) Patent No.: US 10,977,256 B2
(45) Date of Patent: Apr. 13, 2021

(54) SYSTEM FOR AGGREGATION AND PRIORITIZATION OF IT ASSET FIELD VALUES FROM REAL-TIME EVENT LOGS AND METHOD THEREOF

(71) Applicant: Discovered Intelligence Inc., Toronto (CA)

(72) Inventor: Paul Richard Johnson, Toronto (CA)

(73) Assignee: DISCOVERED INTELLIGENCE INC., Mississauga (CA)

( * ) Notice: Subject to any disclaimer, the term of this patent is extended or adjusted under 35 U.S.C. 154(b) by 283 days.

(21) Appl. No.: 15/909,486

(22) Filed: Mar. 1, 2018

(65) Prior Publication Data

US 2018/0253434 A1 Sep. 6, 2018

Related U.S. Application Data

(60) Provisional application No. 62/466,049, filed on Mar. 2, 2017.

(51) Int. Cl.
| | | |
|---|---|---|
| *G06F 16/2457* | (2019.01) | |
| *G06F 11/30* | (2006.01) | |
| *G06Q 10/08* | (2012.01) | |
| *G06F 16/21* | (2019.01) | |
| *H04L 29/06* | (2006.01) | |
| *G06F 21/60* | (2013.01) | |
| *G06F 11/34* | (2006.01) | |
| *G06F 16/2455* | (2019.01) | |
| *H04L 29/08* | (2006.01) | |
| *G06F 21/50* | (2013.01) | |
| *G06F 21/62* | (2013.01) | |
| *H04W 4/70* | (2018.01) | |

(52) U.S. Cl.
CPC .... *G06F 16/24578* (2019.01); *G06F 11/3065* (2013.01); *G06F 11/3476* (2013.01); *G06F 16/214* (2019.01); *G06F 16/24556* (2019.01); *G06F 21/604* (2013.01); *G06Q 10/087* (2013.01); *H04L 63/20* (2013.01); *G06F 21/50* (2013.01); *G06F 21/6218* (2013.01); *G06F 2201/86* (2013.01); *H04L 67/12* (2013.01); *H04W 4/70* (2018.02)

(58) Field of Classification Search
None
See application file for complete search history.

(56) References Cited

U.S. PATENT DOCUMENTS

| | | | | |
|---|---|---|---|---|
| 8,180,332 | B2 * | 5/2012 | Ramer | G06Q 30/02 455/414.1 |
| 2014/0108442 | A1 * | 4/2014 | Paglia | G06F 16/24 707/758 |
| 2016/0371395 | A1 * | 12/2016 | Dumant | G06F 16/24575 |

FOREIGN PATENT DOCUMENTS

WO 2011094734 A2 8/2011

* cited by examiner

*Primary Examiner* — Fateh M Obaid (57) ABSTRACT

The invention relates to a system and a method of identifying and managing IT assets that aggregates fields and their associated values from multiple event log data sources that share one or more common IT asset identifiers and leverages a prioritization approach to determine the most appropriate values for each of the fields. The system utilizes two inputs, namely event log data source inputs and prioritization inputs. Through aggregation of data from different input data sources, the system pieces together a more comprehensive record of field values for a given IT asset, to generate in real-time the updated asset inventory output.

20 Claims, 5 Drawing Sheets

SYSTEM FOR AGGREGATION AND PRIORITIZATION OF IT ASSET FIELD VALUES FROM REAL-TIME EVENT LOGS AND METHOD THEREOF

FIELD OF INVENTION

The invention relates generally to a system and a method of identifying and managing IT assets and in particular to a system and a method of updating field values of a large number of identified IT assets using real-time data from many different data sources relating to each of the IT assets.

BACKGROUND OF INVENTION

Knowing and understanding information technology (IT) assets, their use and ownership is critical for information security teams; such that the information that is processed by them can be protected and risk exposure reduced. However, IT assets are in a constant state of flux, making the task of keeping such information current and up-to-date extremely challenging. Even the best IT asset management solutions have a degree of inaccuracy and are often infrequently or manually updated, may have data gaps or inaccuracies, or are simply missing information about certain assets. There is therefore a need to update such information whenever practical, and in real-time, where possible. With the rise of Big Data and the Internet of Things (IoT), there are an ever-increasing number of real-time, event based, log data sources generated by computer systems on our networks and many of these event log data sources contain data directly related to the IT assets on the network. This event log data can be utilized for updating such information in real-time, thus providing great insight about specific IT assets.

Event log based data sources often contain some fields and associated values specific to IT assets but they do not always have the same data. For example, an event log generated by one computer system might contain an IP address and user name field for a given asset, while another event log generated by a different computer system might contain a Media Access Control (MAC) address and a location for a given IT asset. It is therefore desirable to use a computing system to aggregate and correlate information from many different event log data sources at scale. This aggregated data then may be used to build an accurate inventory of IT assets.

However, when all this event log information is aggregated, we often end up with competing or conflicting field values pertaining to specific assets, depending on the data set. For example, we might have two different IP addresses for a particular IT asset. Additionally, some event log data sources may contain fields and values that other data sources do not. The resolution of these conflicts, and the correlation and aggregation of data from such imperfect data sources, will often need to be resolved manually, which would defeat the purpose of using a computing system to aggregate and correlate information from many different event log data sources at scale.

The forgoing creates challenges and constraints for providing a computing system and a method that can update records about an IT asset, in particular, to automate as much as possible the correlation and aggregation of data from such imperfect data sources, and in real-time, without introducing conflicts and data of less desirable quality into the system and without much manual intervention. Thus, there is a need for an improved computing system and a method as compared to the existing art. It is an object of the present invention to mitigate or obviate at least one of the above mentioned disadvantages.

SUMMARY OF INVENTION

In one aspect, the present invention relates to a system that aggregates fields and their associated values from multiple event log data sources that share one or more common IT asset identifiers and leverages a prioritization approach to determine the most appropriate values for each of the fields. Such asset identifiers may be the same in all event log data sources but that is not required nor necessary. Through aggregation of differing event log data sources, the system pieces together a more comprehensive record of field values for a given IT asset.

A computer is utilized to perform this functionality at scale and can process and prioritize millions of aggregated real-time event logs per minute. For example, each event log data source and/or specific fields within each event log may be assigned a priority value. Field values are extracted from the event logs. When the event log data sources are aggregated, the field values with assigned priority values are sorted and ranked by a computer according to a prioritization algorithm to determine which of the field values from the aggregated sources should be retained. This enables continually updating a real-time list (or inventory) of asset identities, their associated fields and retained values.

In one aspect of the invention, there is provided a method of updating stored electronic records of a plurality of IT (information technology) assets, the stored electronic records of each of the IT assets comprising multiple field values and being stored in a persistent data storage device of a data processing system. The method comprises the steps of the data processing system receiving, from IT assets or data source computers connected to IT assets, event log data containing one or more field values of electronic records of the plurality of IT assets and separating the received event logs in the event log data according to data sources associated with each of the event logs, retrieving priority values assigned to record fields of the electronic records contained in each of the separated event logs, associating each one IT asset of the plurality of IT assets with the electronic records of the each one IT asset contained in the separated event logs, for each one IT asset of the plurality of IT assets and each record field of the electronic record of the each one IT asset, aggregating field values of the each record field of the electronic records of the same each one IT asset from all separated event logs containing the electronic records of the each one IT asset, identifying one field value among the aggregated field values of the each record field as a selected field value according to a prioritization algorithm, the prioritization algorithm being based on priority values assigned to the respective record fields contained in the multiple separated event logs, and assigning the selected field value to the each record field of a corresponding stored electronic record stored in the persistent data storage to update the stored electronic record.

As a feature, each electronic record contains a record field for an asset identifier, the asset identifier associating the electronic record with an IT asset identified by the asset identifier. Additionally, there may be more than one record field for a group of asset identifiers which associate the electronic record with the IT asset identified by the group of asset identifiers.

As another feature of this method, the assigned priority values may be numeric, alphanumeric, or a combination thereof, the same priority value may be assigned to all record fields in an event log data source, or different priority values are assigned to record fields in a data source, depending on the record field.

As another feature of this method, log priority values are assigned to event logs and the prioritization algorithm also takes into account log priority values. As a different feature, the priority algorithm selects a field value if a combined priority value combined from priority value of the field value and the log priority value of the event log from which the field value is selected produce the highest value. As yet another feature, the priority algorithm selects a field value if the event log data source from which the field value is selected has the highest priority value.

As a further feature, the priority algorithm selects a field value in accordance with a tie-breaker mechanism when at least two different field values are associated with the highest priority value, and the tie-breaker mechanism may select the most recent field value or a field value that appears in the most number of event logs to break the tie.

In another aspect of the invention, there is provided a data processing system for updating electronic records of a plurality of IT (information technology) assets. The electronic records of each of the IT assets comprise multiple field values. The system comprises persistent data storage for storing electronic records of the plurality of IT assets and computer instructions, a network interface for receiving data from IT assets or data source computers connected to IT assets, and at least one microprocessor in data communication with the persistent data storage and the network interface. The at least one microprocessor is configured to receive, from IT assets or data source computers connected to IT assets over the network interface, event log data containing one or more field values of electronic records of the plurality of IT assets and separating the received event logs in the event log data according to data sources associated with each of the event logs, retrieve priority values assigned to record fields of the electronic records contained in each of the separated event logs, associate each one IT asset of the plurality of IT assets with the electronic records of the each one IT asset contained in the separated event logs, for each one IT asset of the plurality of IT assets and each record field of the electronic record of the each one IT asset, aggregate field values of the each record field of the electronic records of the same each one IT asset from all separated event logs containing the electronic records of the each one IT asset, identify one field value among the aggregated field values of the each record field as a selected field value according to a prioritization algorithm, the prioritization algorithm being based on priority values assigned to the respective record fields contained in the multiple separated event logs, and assign the selected field value to the each record field of a corresponding stored electronic record stored in the persistent data storage to update the stored electronic record.

As a feature, each electronic record contains a record field for an asset identifier and the at least one microprocessor is further configured to associate the electronic record with an IT asset identified by the asset identifier.

As another feature, log priority values are assigned to event logs and the prioritization algorithm also takes into account log priority values. Additionally, the priority algorithm may select a field value if a combined priority value combined from priority value of the field value and the log priority value of the event log from which the field value is selected produce the highest value.

As yet another feature, the priority algorithm selects a field value in accordance with a tie-breaker mechanism when at least two different field values are associated with the highest priority value, and the tie-breaker mechanism may select the most recent field value or a field value that appears in the most number of event logs to break the tie.

In another aspect of the invention, there is provided a non-transitory computer-readable medium having stored thereon computer readable code. When the code is executed by a processor of a computing device, the code causes the computing device to perform a method of updating stored electronic records of a plurality of IT (information technology) assets, the stored electronic records of each of the IT assets comprising multiple field values and being stored in a persistent data storage of a data processing system. The method comprises the steps of the data processing system receiving, from IT assets or data source computers connected to IT assets, event log data containing one or more field values of electronic records of the plurality of IT assets and separating the received event logs in the event log data according to data sources associated with each of the event logs, retrieving priority values assigned to record fields of the electronic records contained in each of the separated event logs, associating each one IT asset of the plurality of IT assets with the electronic records of the each one IT asset contained in the separated event logs, for each one IT asset of the plurality of IT assets and each record field of the electronic record of the each one IT asset, aggregating field values of the each record field of the electronic records of the same each one IT asset from all separated event logs containing the electronic records of the each one IT asset, identifying one field value among the aggregated field values of the each record field as a selected field value according to a prioritization algorithm, the prioritization algorithm being based on priority values assigned to the respective record fields contained in the multiple separated event logs, and assigning the selected field value to the each record field of a corresponding stored electronic record stored in the persistent data storage to update the stored electronic record.

In other aspects the invention provides various combinations and subsets of the aspects described above.

BRIEF DESCRIPTION OF DRAWINGS

For the purposes of description, but not of limitation, the foregoing and other aspects of the invention are explained in greater detail with reference to the accompanying drawings, in which.

DETAILED DESCRIPTION

The description which follows and the embodiments described therein are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

In one aspect, the present invention relates to a system that aggregates fields and their associated values from multiple event log data sources that share one or more common IT asset identifiers and leverages a prioritization approach to determine the most appropriate values for each of the fields. Such asset identifiers may be the same in all event log data sources but that is not required nor necessary. The system allows for the aggregation and prioritization of IT asset field values from multiple input event log data sources. The system requires two inputs, namely event log data source inputs and prioritization inputs. Through aggregation of data from different input event log data sources, the system pieces together a more comprehensive record of field values for a given IT asset. A computer is utilized to perform this functionality at scale and can process and prioritize millions of aggregated real-time event logs per minute to generate the updated asset inventory output.

To resolve any possible conflicts or inconsistencies, each event log data source and/or specific fields within each event log may be assigned a priority value, provided by the prioritization inputs. When the event log data sources are aggregated, the assigned priority values are utilized in a prioritization algorithm to determine which of the field values from the aggregated sources should be retained. This enables continually updating a real-time list (or inventory) of asset identities, their associated fields and retained values.

This is described in further detail below.

Figure 1:
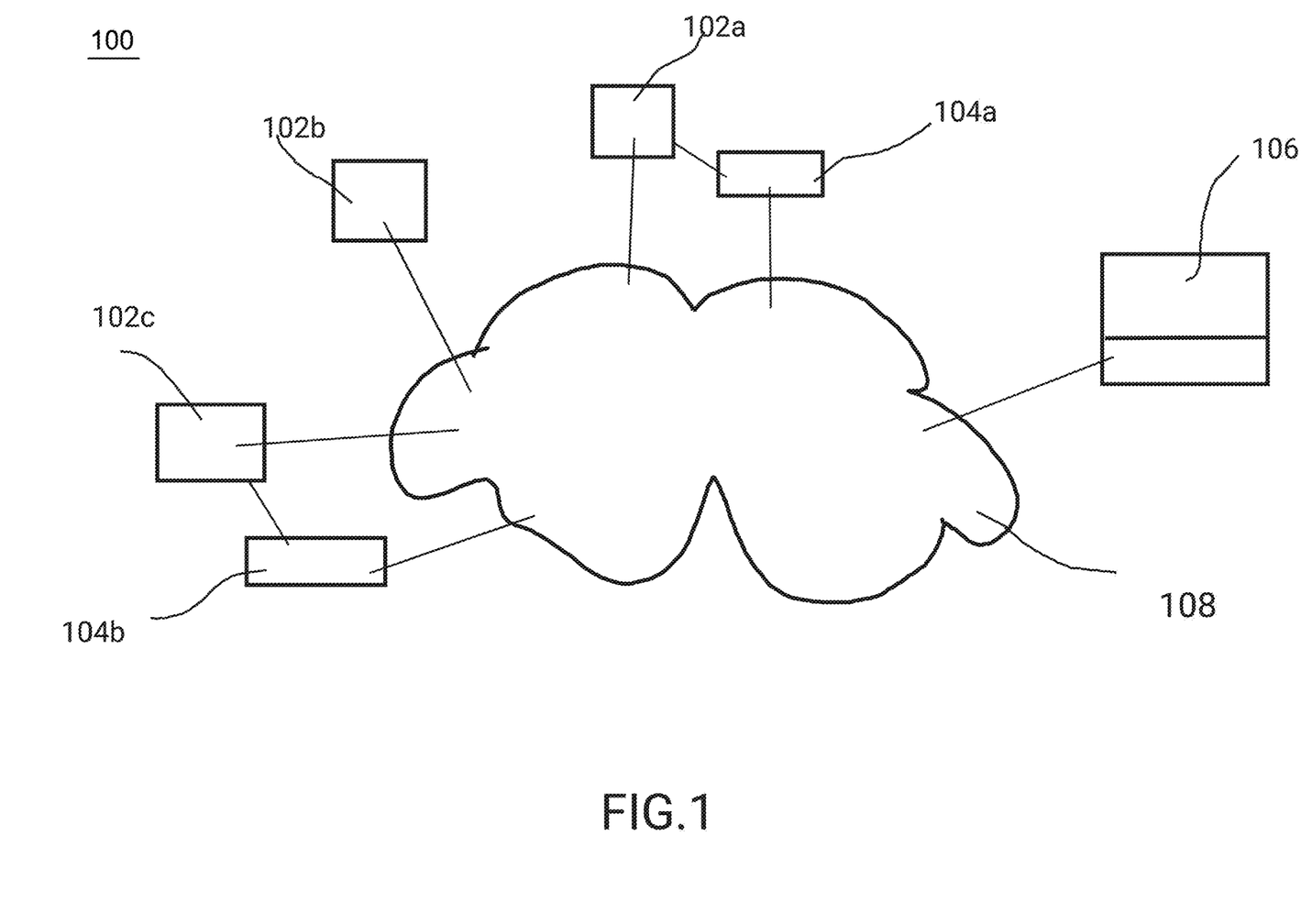
FIG. 1 illustrates schematically several IT assets and a computing system that processes event log data sources to generate an IT asset inventory.

FIG. 1 is a schematic diagram that illustrates several IT assets 102a,102b,102c to be managed by the system 100, which includes data computer systems 104a,104b that are in network communication with the IT assets, and a computing system 106 (or systems) that processes event log data sources made available by the data computer systems 104a, 104b (which may include those operating at or supported by the IT assets) or an IT asset 102b itself, all communicating over a general communication network 108. Communication network 108 enables the network communication between the computing system and each of the event log data source computer systems and between the event log data source computer systems and the IT assets. As will be appreciated by those skilled in the art, an IT asset may provide its event log directly, or may communicate with one or more data computer systems, which then generate and make the event logs about the IT asset available, as is also illustrated in FIG. 1.

In this document, "information technology (IT) asset" may include any device, element or data component that can be leveraged for information related activity. IT assets are individually identifiable, through their respective identifiers. Examples of these identifiers include Internet Protocol (IP) addresses, usernames, hostnames, Media Access Control (MAC) addresses and software applications. The term "event logs" means computer generated log messages, typically generated in real-time, with each log message containing a timestamp of occurrence, together with other information. Often, these event logs also are referred to as audit logs, or audit records. As will be appreciated by those skilled in the art, event log data can be generated by computers, devices or software applications. Further, while often event logs are stored in a data storage device as event log data files, such event log data also may be streamed or transmitted directly to a data processing system from an IT asset or a data source computer for immediate processing, as required or desirable.

Figure 2:
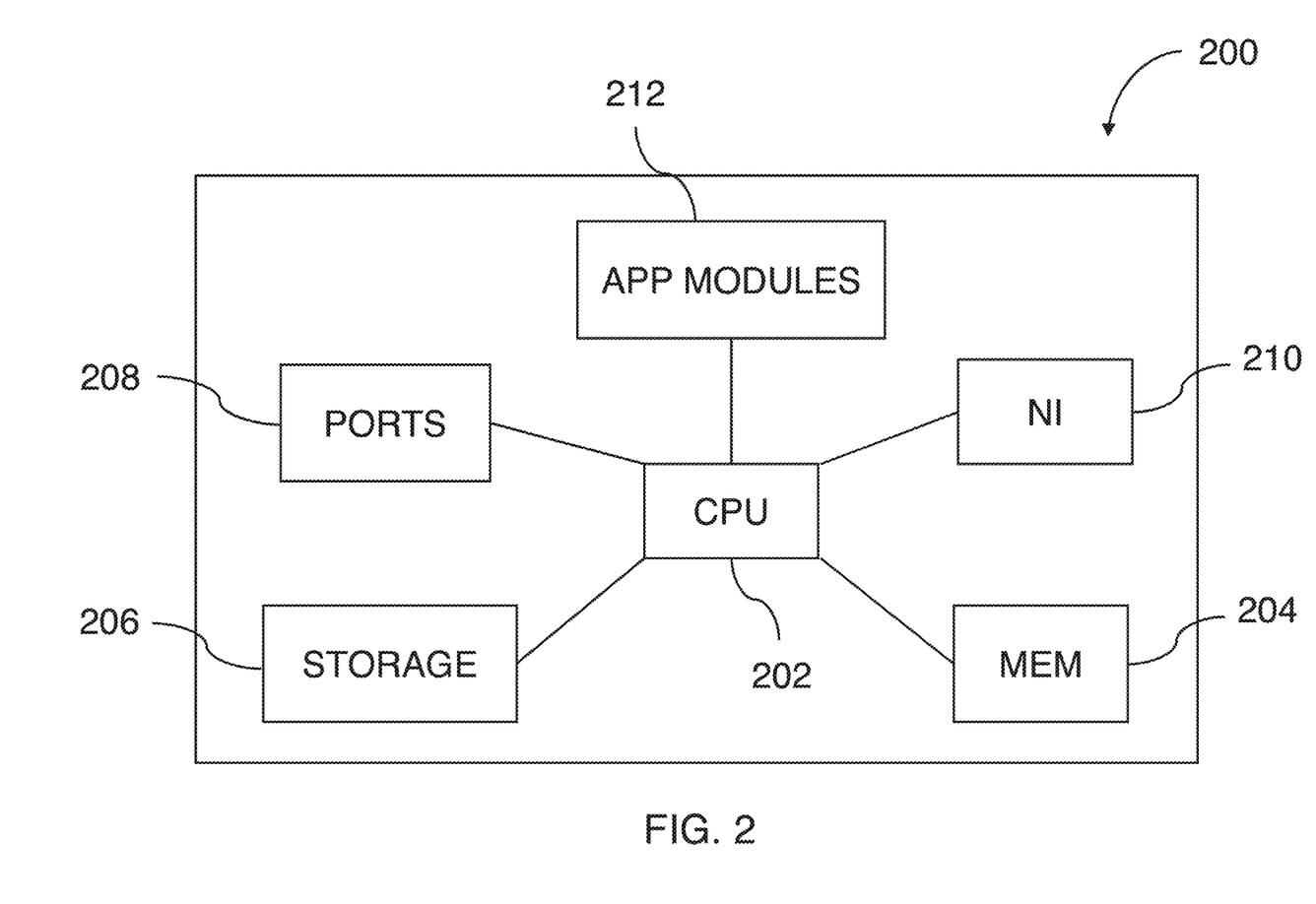
FIG. 2 illustrates schematically an example configuration of a computing system.

The computing system 106 (or data computer system 104a,104b) generally includes hardware unit having executed thereon stored instructions or instructions received over a network connection. The instructions may be stored on a storage device that forms part of or is connected to the hardware unit persistently, or may be transmitted to the hardware unit and stored on the storage device for the duration of the execution of the instructions. A non-limiting example is illustrated in FIG. 2. It will be understood that a hardware unit may include more components than those illustrated in FIG. 2, or less. Hardware unit 200 may be a server or computer or some hardware device with computation power, which often includes one or more microprocessors or CPUs 202 (central processing unit), one or more memory storage devices, such as a transient memory device 204 and a persistent, or long-term storage device 206, some local and communication ports 208 for connection to local devices, a network interface 210 for connection to the communication network 108, and one or more application modules 212 executing on the microprocessor or CPU 202 for performing certain programmed functions. Further, when a hardware unit may have several application modules executing on the microprocessor or CPU, it will be clear from the context which application module is causing the microprocessor or CPU to execute the function (e.g., a ranking unit performing a ranking operation). Where the context may not uniquely identify a particular module or indicate whether it is the hardware unit itself that is being referenced, it will be identified explicitly in the description. Thus, the function as described being provided by an application module will be understood to be the same as being provided by the hardware unit, as programmed by the instructions of the program that is stored on a non-transitory physical medium or media, e.g., stored on the storage device 206. Similarly, when a hardware unit is described to perform a function, it will be understood that the hardware unit performs the function as being configured by the instructions of an application module or modules stored on the storage device 206.

The data source computer systems 104a, 104b are also similarly configured, in order to collect and generate the event log data about the respective IT assets and make such event data log data available to the computing system. A data source computer system may use its port 208 to communicate with an IT asset 102 directly in order to generate the event log data, or it may communicate with an IT asset 102 over the communication network 108, utilizing its network interface 210, to generate the event log data, among others. The event log data generated may be stored to its storage device 206, and made available to the computing system 106 over the communication network 108, or may be transmitted to the computing system 106 while or after the event log data is generated, or made available to the computing system 106 in any other suitable manner, such as placed on a network server (not shown), accessible over the communication network.

Figure 3:
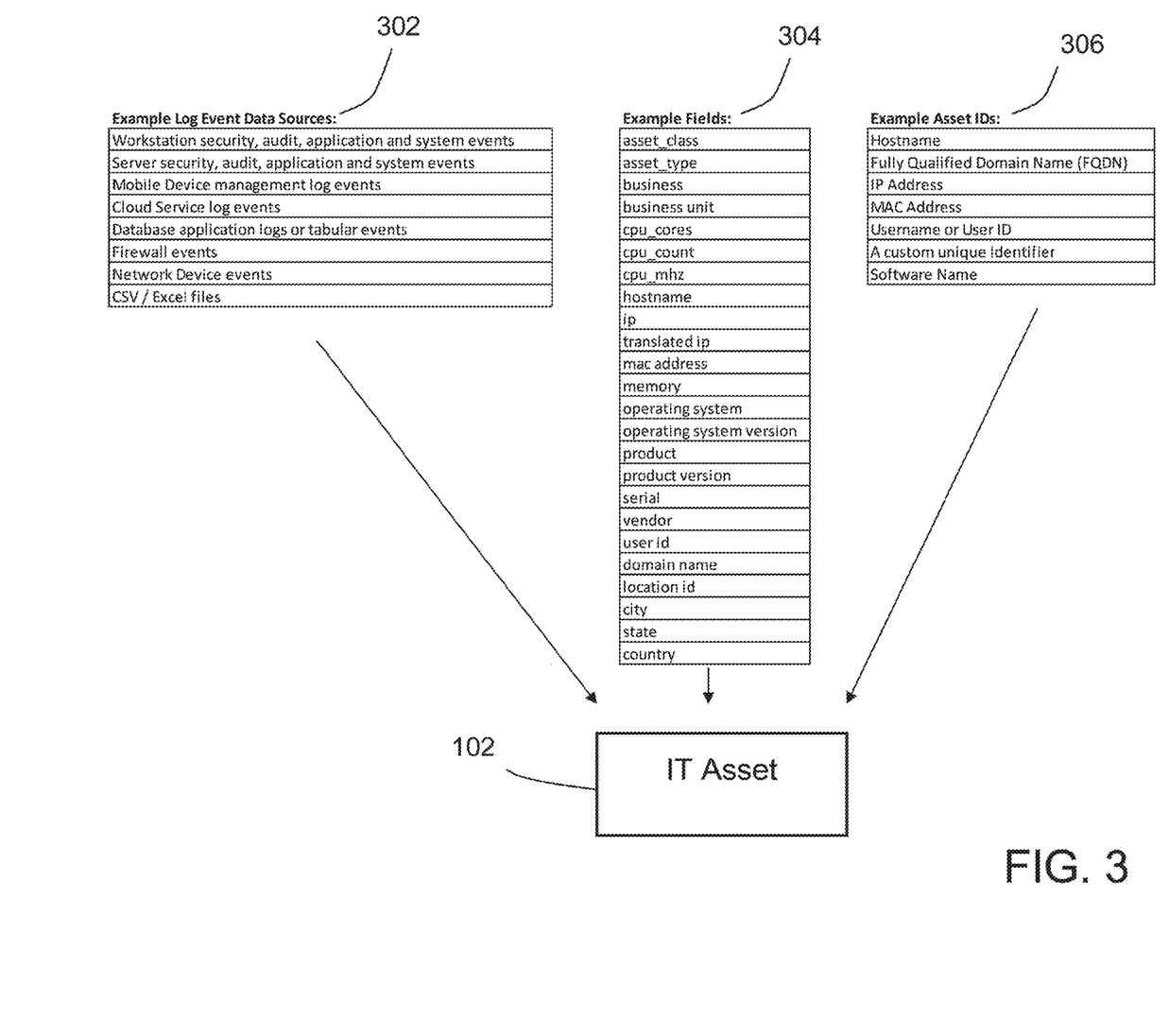
FIG. 3 illustrates some examples of different event log data sources from which event logs may be generated and then different fields contained within these event logs may be processed by the computing system shown in FIG. 1 to generate the IT asset inventory.

FIG. 3 provides an example of associating with an IT asset 102 different data sources from which event data log 302 may be generated, a non-exhaustive list of fields 304 that a record about an IT asset may include, and some examples of asset identifiers 306.

An IT asset 102 may be any device that is connected to network and identifiable by its identifier. It may or may not include its own computing hardware. As will be appreciated, IT assets may include a computer system, mobile or otherwise, wearable (computing) devices connected to a network, smart telephone devices, or smart appliances, among others. An IT asset may be associated with multiple event log data sources and thus the computing system may receive event log data from multiple event log data source inputs (including the IT asset itself if it is capable of collecting/storing and making available event log data). Thus, the source of event log data may be categorized based on the different data source units that generate and/or make available the event log data. Additionally, each data source unit (which may be the IT asset or the data source computer system collecting data from the IT asset) may also provide different, i.e., multiple, event logs based on different types of events or generated by different application programs, which also provide another way of dividing the event logs into different sources. These types of sources may include, for example, as illustrated in FIG. 3, event logs 302 of workstation security, audit, application and system events, server security, audit, application and systems events, mobile device management log events, cloud service log events, database application logs or tabular events, firewall events, network device events, and csv/excel files, among others. As will be appreciated, the listing in FIG. 3 is only a non-exhaustive listing of event log data sources, serving as an example of the type of real-time data sources generated by other data computing systems 104a,104b that may contain IT asset relevant content.

Each unique IT asset would have a set of associated fields as its record. As illustrated in FIG. 3, an electronic record 302 about an IT asset 102 comprises multiple record fields. FIG. 3 shows a non-exhaustive listing of example record fields that are associated with an individual IT asset 102. Each data source would contain one or more of these record fields, which may be included in an electronic record 302 relating to a particular IT asset. The field values of these record fields provide valuable information to an IT management team. These fields may be, for example, asset_class, asset_type, business, business unit, cpu_cores, cpu_count, cpu_mhz, hostname, ip, translated ip, mac address, memory, operating system, operating system version, product, product version, serial, vendor, user id, domain name, location id, city, state, and country, among others. It will be appreciated that different data sources will not always contain the same record fields.

An IT asset 102 is identified by its asset identifier 306, a special record field. Each asset identifier 306 must be unique to that IT asset in order to properly identify the IT asset, when that single identifier is used to identify that IT asset. An IT asset, however, may have multiple asset identifiers and be identified by a unique combination of the asset identifiers. For example, one may use multiple record fields to store a set of asset identifiers to uniquely associate an IT asset to its electronic record. FIG. 3 provides an example of a non-exhaustive listing of example asset identifiers 306 that could be leveraged to uniquely identify a given network asset. These identifiers may include, as described earlier, hostname, fully qualified domain name ("FQDN"), IP address, MAC address, username or User ID, a custom unique identifier, software name, among others.

Data, i.e., field values 304, is aggregated for each Asset ID 306 from each of the event log data source inputs 302. This data source aggregation may occur as a historic batch input of event log data, or as a real-time stream of event log data. When the data sources are aggregated, the system will associate the priority assigned to each data source or each data source field. Aggregation will, in many cases, result in multiple field values for each field associated with a given Asset ID if that field value is common to many sources being aggregated. Aggregation will also result in data sources providing some field values for a given Asset ID and other data sources providing other field values. Each field value will have an assigned priority. This is illustrated in FIG. 4, which shows an example of a process to correlate and aggregate field values from different data sources, namely, different event logs, to update a record of field values for each given IT asset.

Figure 4:
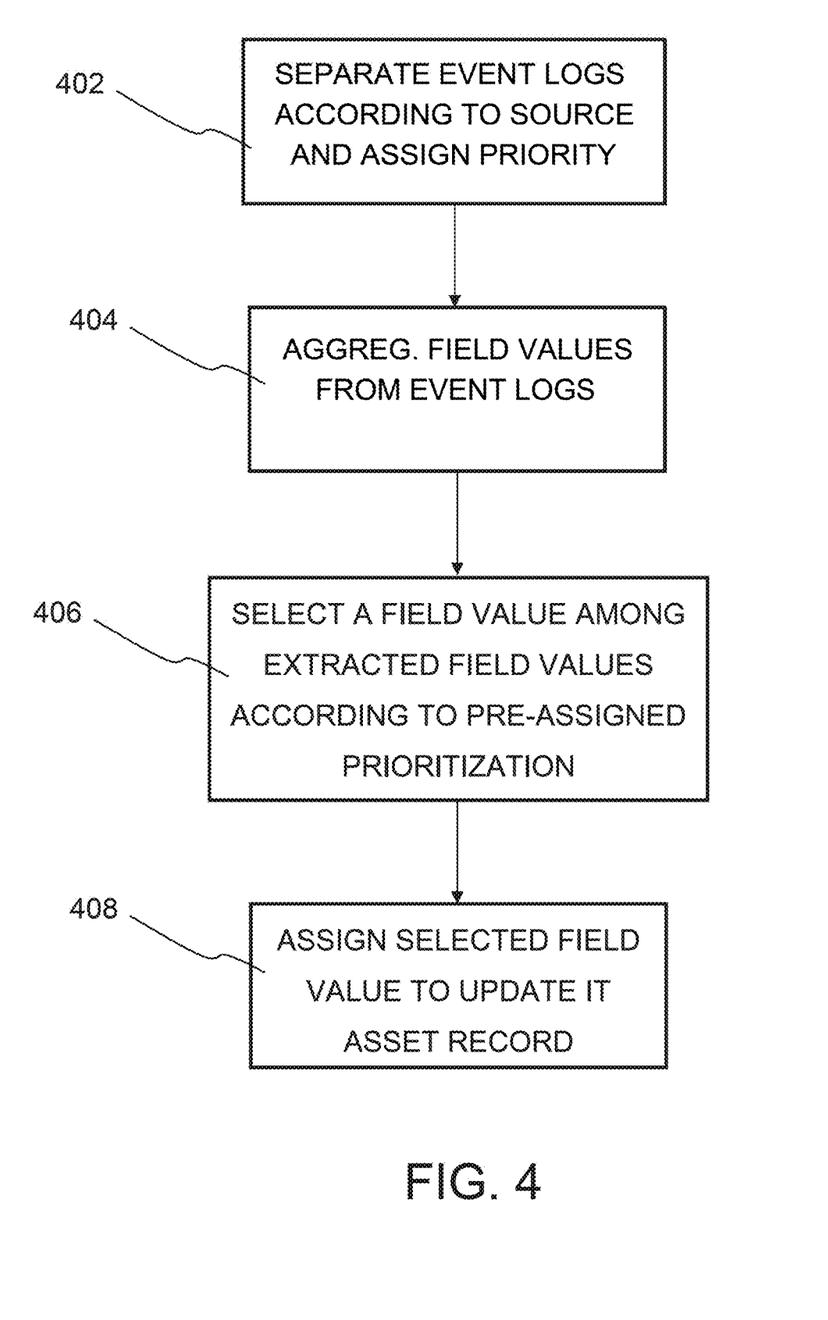
FIG. 4 is a flow chart to illustrate a process that the computing system in FIG. 1 may follow to generate the IT asset inventory.

Referring to FIG. 4, first, as a preparation, event logs are separated according to data sources associated with each of the event logs, e.g., where the event logs are generated or obtained, and each is assigned a priority value (step 402). Event logs may come from a variety of sources, as illustrated in FIG. 3. Typically, at the time of generation, these event log data sources are already separately generated and stored, i.e., they are already separated. Should a consolidated log file be used to capture all event log data, these event log data are either separated into physically distinct files or logically tagged and separated. Each of these event log data sources 302 are typically high volume in nature and may each generate well over a million events per minute. In order to extract information from such multiple source and high volume data, one may, for example, first identify event logs according to the data source units, and/or further according to the events being recorded, and name each event log data source accordingly. Of course, any other ways of identifying the source of an event log may be used. Next, each field in each separate data source is assigned a priority value, which will later be retrieved by data processing system during aggregation. The priority value may be numeric (e.g., "1", "2", "3" etc), or alphabetical (e.g., "A", "B", "C" etc.), or alphanumeric (e.g., "A1", "A2", "B1", "B2" etc), or in any other suitable fashion. The priority ranking may be in an ascending order according to the priority value, or descending, or again, arranged in any other suitable fashion. Here, although identifying a source and assigning to the fields in that source a respective priority value are described as two separate sub-steps, and in that order, it will be appreciated that they may be in a single step. Further, a source itself may be assigned a priority value and all fields in that source will then share the same priority value. Further, it is also possible that a source is first given a priority value and then event logs assigned to that source, provided that the event log is associated with a source that has a specific priority value assigned therewith.

Next, the field values associated with a particular field of an IT asset from each of the event log data sources are extracted from the event logs, where necessary, and aggregated to provide an aggregated data (step 404). As will be appreciated, each of the event log data sources 302 being aggregated share a common asset identifier 306 (or Asset ID), or portions of a common set of asset identifiers that uniquely identifies an individual IT asset 102. Example asset IDs are illustrated in FIG. 3. Each event log data source contains one or more fields associated with the specific asset ID, as illustrated in FIG. 3. Though it will be appreciated that each data source 302 may share a common asset ID 306, they may include different fields in the data files and the same field included in different data sources may have different values. As a result, each data source does not necessarily contain the same fields as another data source for a given asset ID and the field value of a field in one data source is not necessarily the same as the field value of the same field included in another data source.

Additionally, at this stage, a field may have several different values from different sources. Each field is associated with, i.e., has been assigned, a priority value. The assignment of priority value may be based on the priority values assigned to the respective data sources, or may be that directly associated with the field of a particular data source. All associated priority values are included with the extracted field values in the aggregated data.

Figure 5:
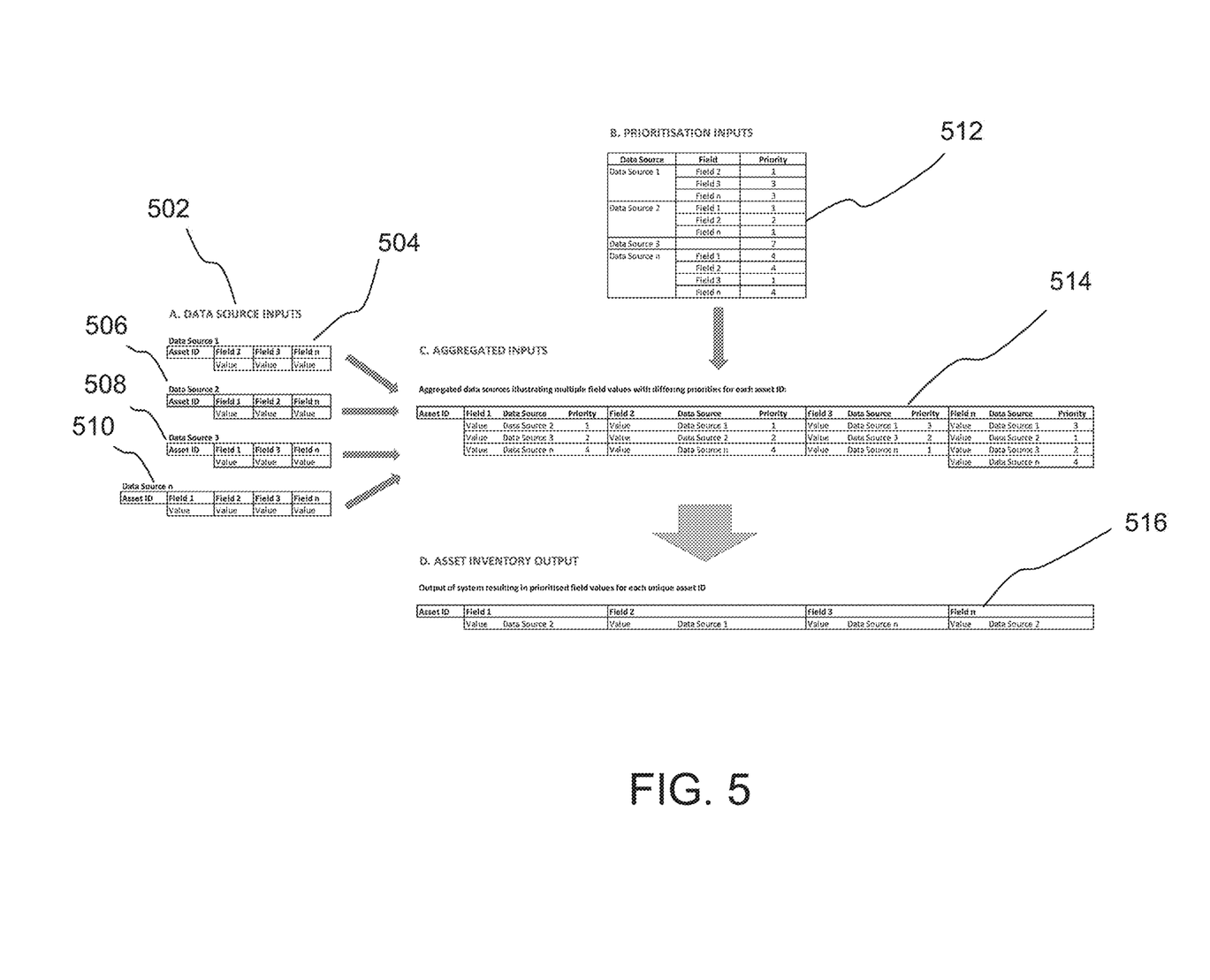
FIG. 5 illustrates an example of aggregating field values from different input event log data sources into a consolidated IT asset inventory output according to priority values assigned to different data sources and a simple prioritization algorithm.

FIG. 5 provides another conceptual view of the aggregated IT asset prioritization system, illustrating event log data source inputs, prioritization of sources and fields and system output. In FIG. 5, there is illustrated an example of three (3) data sources 502, together with a data source n, all about the same IT asset having an identifier "Asset ID". The example in FIG. 5 illustrates a scenario that the first data source 504 ("Data Source 1") provides field values for field "2", field "3" and field "n" (but not field "1"), the second data source 506 ("Data Source 2") provides field values for field "1", field "2" and field "n" (but not field "3"), the third data source 508 ("Data Source 3") provides field values for field "1", field "3" and field "n" (but not field "2"), and the additional n-th data source 510 ("Data Source n") provides field values for field "1", field "2", field "3" and field "n". This is an example to signify that as many data sources as required can be considered. The field values (fields "1", "2", "3" and "n") are extracted from each of these data sources (data sources "1", "2", "3" and "n").

As noted earlier, a prioritization value will be associated with each event log coming from each data source input. Priority values can be assigned to the individual event log data sources themselves or specific fields found within the event log data. The assignment of priority values of the event log data sources and/or fields may be automated by another process or manually inputted. A combination of priority assigned at the data source level and the field level could be utilized. This combined assignment is illustrated in the prioritization table 512 in FIG. 5, whereby priority value is assigned at the field level for Data Source 1, 2 and n but assigned only at the Data Source level for Data Source 2. When priority is assigned at Data Source level, all field values in that data source has the same priority value assigned to the Data Source. Field values from different sources are aggregated for each asset ID, to obtain an aggregated collection, or aggregated data 514, comprising a collection of extracted field values, as shown in FIG. 5. No matter in what manner the priority value is assigned, the system retrieves or extracts this priority value for later use in the prioritization.

After the field values are extracted for each of the identified IT assets and aggregated, one field value for each field is selected from these extracted field values for updating the record of the IT asset. The particular field value is identified or selected in accordance with a prioritization scheme or algorithm (step 406). FIG. 5 illustrates an example in which the field values with highest priority values are kept (i.e., the field values with a priority of 1). As illustrated in FIG. 5, a field value with the highest priority value is selected amongst the many field values from different sources of different priority values (e.g., field value of Field 1 from data source 2 is selected over other values from data source 3 and data source n because data source 2 has the highest priority value, 1). In general, a field value is identified or selected from these extracted field values in accordance with a prioritization algorithm, or prioritization logic, using these priority values. Example prioritization logic may include sorting by priority and retaining only the field value of highest priority values or other more complex logic as further explained below.

FIG. 5 is to illustrate a very simple prioritization algorithm, in order to explain the process and concept. In general, a priority value is associated with each event log coming from each data source input, which can be assigned to the individual data source themselves or specific fields found within the event logs. In addition to assignment at either data source level or specific field level, a combination of priority assigned at the data source level and the field level could be utilized as well, such that a field value in an event log with the highest combined priority value will be selected. Additionally, a source may be assigned a priority value and a field within the source may be assigned a sub-priority value and the priority ranking may be first based on priority value at the source level and the sub-priority value may be used as a tie-breaker, where necessary. Further, an alphabetical, numeric or any other prioritization method can be used.

As will be appreciated, although often one expects the field value from data sources of the same priority to be the same, it is possible that inconsistencies exist, namely field values of the same field of the same IT asset from different data sources of the same priority are not the same. The prioritization algorithm may include further tie-breaking mechanism, such as tie-breaking by timestamp (the value associated with the later timestamp, i.e., the most recent field value, is selected) or tie-breaking by majority voting (the field value associated with most data sources is selected), or any other suitable tie-breaking mechanism.

For each of the fields associated with a given asset ID, the computer system will retain only the field value that is selected according to the prioritization algorithm, i.e., the prioritization logic. The identified or selected field value is then assigned to the respective field in a corresponding electronic record for each of the IT assets that is stored persistently, to update the stored electronic record (step 408). This updated electronic record is saved to a record data file or database that is stored in persistent data storage, such as long-term storage device 206. The stored electronic record thus may be retrieved by other computer systems, such as an IT asset management, for further processing, analysis or manipulation. The resulting output 516, i.e., the updated IT asset inventory which contains electronic or digital records of many IT assets, is illustrated in FIG. 5.

As will be appreciated, through aggregation of the different event log data sources, the system builds a far more complete record of field values associated with a given Asset ID. Through prioritization of the field values from the different event log data sources, the system retains only the best values (according to the particular prioritization scheme) for a given field associated with a given Asset ID. Although FIG. 5 illustrates the aggregation of field values of only a single IT asset (i.e., field values pertaining to a single IT Asset ID), it will be appreciated that, in general, there may be thousands or millions of asset IDs, essentially forming an entire asset inventory. The resulting IT Asset Inventory output is continually updated in real-time as new event logs flow into the system and get prioritized and processed and all record fields of all stored electronic records of all IT Assets eventually may all be updated.

Various embodiments of the invention have now been described in detail. Those skilled in the art will appreciate that numerous modifications, adaptations and variations may be made to the embodiments without departing from the scope of the invention, which is defined by the appended claims. The scope of the claims should be given the broadest interpretation consistent with the description as a whole and not to be limited to these embodiments set forth in the examples or detailed description thereof.

What is claimed is:

1. A method of updating stored electronic records of a plurality of IT (information technology) assets, each IT asset being connected to a communication network and being identifiable by its asset identifier or identifiers, a stored electronic record of each of the IT assets comprising multiple record fields, the asset identifier or identifiers and information about the IT asset being saved as field values in the record fields, the electronic records being stored in a persistent data storage device of a data processing system, the data processing system being in data communication with IT assets or data source computers connected to IT assets, the method comprising:
   the data processing system receiving, over the communication network, from IT assets or data source computers connected to IT assets, event log data and separating event logs in the received event log data according to data sources associated with each of the event logs, each event log containing data of one or more field values of electronic records of the plurality of IT assets,
   retrieving priority values assigned to record fields of the electronic records contained in each of the separated event logs,
   associating each one IT asset of the plurality of IT assets with the electronic records of the each one IT asset contained in the separated event logs,
   for each record field of the electronic record of the each one IT asset,
      aggregating field values of the each record field of the electronic records of the same each one IT asset from all separated event logs to obtain a set of aggregated field values corresponding to the each record field,
      identifying one field value as a selected field value from the set of the aggregated field values of the each record field according to a prioritization algorithm, the prioritization algorithm being based on priority values assigned to the respective record fields contained in the multiple separated event logs, and
      assigning the selected field value to the each record field and storing the selected field value to the stored electronic record to update the stored electronic record stored in the persistent data storage device,
   until all field values of electronic records contained in the received event log data are used to update the stored electronic records.

2. The method of claim 1, wherein each electronic record contains a record field for an asset identifier, the asset identifier associating the electronic record with an IT asset identified by the asset identifier.

3. The method of claim 2, wherein each electronic record contains more than one record field for a group of asset identifiers including the asset identifier, the group of asset identifiers associating the electronic record with the IT asset identified by the group of asset identifiers.

4. The method of claim 1, wherein the assigned priority values are numeric, alphanumeric, or a combination thereof.

5. The method of claim 1, wherein all record fields in an event log are assigned the same priority value.

6. The method of claim 1, wherein log priority values are assigned to event logs and the prioritization algorithm also takes into account log priority values.

7. The method of claim 6, wherein the priority algorithm selects a field value if a combined priority value combined from priority value of the field value and the log priority value of the event log from which the field value is selected produce the highest value.

8. The method of claim 1, wherein the priority algorithm selects a field value if the data source from which the field value is selected has the highest priority value.

9. The method of claim 1, wherein the priority algorithm selects a field value in accordance with a tie-breaker mechanism when at least two different field values are associated with the highest priority value.

10. The method of claim 9, wherein the tie-breaker mechanism selects the most recent field value from the at least two different field values.

11. The method of claim 9, wherein the tie-breaker mechanism selects from the at least two different field values a field value that appears in the most number of event logs.

12. A data processing system for updating electronic records of a plurality of IT (information technology) assets, each IT asset being connected to a communication network and being identifiable by its asset identifier or identifiers, an electronic record of each of the IT assets comprising multiple record fields, the asset identifier or identifiers and information about the IT asset being saved as field values in the record fields, the data processing system being in data communication with IT assets or data source computers connected to IT assets, the system comprising:
   persistent data storage device for storing electronic records of the plurality of IT assets and computer instructions,
   a network interface for receiving data, over the communication network, from IT assets or data source computers connected to IT assets,
   at least one microprocessor in data communication with the persistent data storage device and the network interface, the at least one microprocessor being configured to:
      receive, from IT assets or data source computers connected to IT assets over the network interface, event log data and separating event logs in the received event log data according to data sources associated with each of the event logs, each event log containing data of one or more field values of electronic records of the plurality of IT assets,
      retrieve priority values assigned to record fields of the electronic records contained in each of the separated event logs,
      associate each one IT asset of the plurality of IT assets with the electronic records of the each one IT asset contained in the separated event logs, and
      for each record field of the electronic record of the each one IT asset,
         aggregate field values of the each record field of the electronic records of the same each one IT asset from all separated event logs to obtain a set of aggregated values corresponding to the each record field,
         identify one field value as a selected field value from the set of the aggregated field values according to a prioritization algorithm, the prioritization algorithm being based on priority values assigned to the respective record fields contained in the multiple separated event logs, and assign the selected field value to the each record field of a corresponding stored electronic record stored in the persistent data storage device and store the selected field value to the corresponding stored electronic record to update the stored electronic record, until all field values of electronic records contained in the received event log data are used to update the stored electronic records.

13. The system of claim 12, wherein each electronic record contains a record field for an asset identifier, and the at least one microprocessor is further configured to associate the electronic record with an IT asset identified by the asset identifier.

14. The system of claim 12, wherein log priority values are assigned to event logs and the prioritization algorithm also takes into account log priority values.

15. The system of claim 14, wherein the priority algorithm selects a field value if a combined priority value combined from the priority value of the field value and the log priority value of the event log from which the field value is selected produce the highest value.

16. The system of claim 12, wherein the priority algorithm selects a field value if the data source from which the field value is selected has the highest priority value.

17. The system of claim 12, wherein the priority algorithm selects a field value in accordance with a tie-breaker mechanism when at least two different field values are associated with the highest priority value.

18. The system of claim 17, wherein the tie-breaker mechanism selects the most recent field value from the at least two different field values.

19. The system of claim 17, wherein the tie-breaker mechanism selects from the at least two different field values a field value that appears in the most number of event logs.

20. A non-transitory computer-readable medium having stored thereon computer readable code that when executed by a processor of a computing device, causes the computing device to perform a method of updating stored electronic records of a plurality of IT (information technology) assets, each IT asset being connected to a communication network and being identifiable by its asset identifier or identifiers, a stored electronic record of each of the IT assets comprising multiple record fields, the asset identifier or identifiers and information about the IT asset being saved as field values in the record fields, the electronic records being stored in a persistent data storage device of a data processing system, the method comprising:

receiving, over the communication network, from IT assets or data source computers connected to IT assets, event log data and separating event logs in the received event log data according to data sources associated with each of the event logs, each event log containing data of one or more field values of electronic records of the plurality of IT assets, retrieving priority values assigned to record fields of the electronic records contained in each of the separated event logs, associating each one IT asset of the plurality of IT assets with the electronic records of the each one IT asset contained in the separated event logs, and for each record field of the electronic record of the each one IT asset, aggregating field values of the each record field of the electronic records of the same each one IT asset from all separated event logs to obtain a set of aggregated field values corresponding to the each record field, identifying one field value as a selected field value from the set of the aggregated field values according to a prioritization algorithm, the prioritization algorithm being based on priority values assigned to the record field of respective electronic records contained in the multiple separated event logs, and assigning the selected field value to the each record field of a corresponding stored electronic record stored in the persistent data storage device and store the selected field value to the corresponding stored electronic record to update the stored electronic record, until all field values of electronic records contained in the received event log data are used to update the stored electronic records.

* * * * *